United States Patent
Behan et al.

(10) Patent No.: US 10,439,206 B2
(45) Date of Patent: Oct. 8, 2019

(54) METHOD AND MATERIAL FOR LITHIUM ION BATTERY ANODES

(71) Applicant: Corning Incorporated, Corning, NY (US)

(72) Inventors: Francis Martin Behan, Corning, NY (US); Indrajit Dutta, Horseheads, NY (US); Brian Alan Kent, Horseheads, NY (US); Shawn Michael O'Malley, Horseheads, NY (US); Vitor Marino Schneider, Painted Post, NY (US); Randall Eugene Youngman, Horseheads, NY (US)

(73) Assignee: CORNING INCORPORATED, Corning, NY (US)

(*) Notice: Subject to any disclaimer, the term of this patent is extended or adjusted under 35 U.S.C. 154(b) by 116 days.

(21) Appl. No.: 15/302,646

(22) PCT Filed: Apr. 9, 2015

(86) PCT No.: PCT/US2015/025153
§ 371 (c)(1),
(2) Date: Oct. 7, 2016

(87) PCT Pub. No.: WO2015/157538
PCT Pub. Date: Oct. 15, 2015

(65) Prior Publication Data
US 2017/0033353 A1  Feb. 2, 2017

Related U.S. Application Data

(60) Provisional application No. 62/016,897, filed on Jun. 25, 2014, provisional application No. 61/977,451, filed on Apr. 9, 2014.

(51) Int. Cl.
| | |
|---|---|
| *H01M 4/36* | (2006.01) |
| *H01M 4/38* | (2006.01) |
| *H01M 4/485* | (2010.01) |
| *H01M 4/04* | (2006.01) |
| *H01M 10/0525* | (2010.01) |
| *H01M 4/134* | (2010.01) |
| *H01M 4/02* | (2006.01) |

(52) U.S. Cl.
CPC ......... *H01M 4/364* (2013.01); *H01M 4/0471* (2013.01); *H01M 4/134* (2013.01); *H01M 4/386* (2013.01); *H01M 4/485* (2013.01); *H01M 10/0525* (2013.01); *H01M 2004/021* (2013.01); *H01M 2004/027* (2013.01)

(58) Field of Classification Search
CPC ........ H01M 4/36; H01M 4/364; H01M 4/485; H01M 4/04; H01M 4/0471; H01M 4/38; H01M 4/386; H01M 10/0525
See application file for complete search history.

(56) References Cited

U.S. PATENT DOCUMENTS

| | | |
|---|---|---|
| 5,371,037 A | 12/1994 | Yonehara |
| 5,856,229 A | 1/1999 | Sakaguchi et al. |
| 6,541,377 B2 | 4/2003 | Kim et al. |
| 8,071,238 B2 | 12/2011 | Le |
| 2008/0038170 A1 | 2/2008 | Sandhage et al. |
| 2009/0092899 A1* | 4/2009 | Treger .................. C01B 33/023 429/188 |
| 2012/0052656 A1 | 3/2012 | Bellman et al. |
| 2013/0020781 A1 | 1/2013 | Kishikawa |
| 2013/0149549 A1 | 6/2013 | Borrelli et al. |
| 2013/0189575 A1* | 7/2013 | Anguchamy ......... C01B 33/023 429/211 |
| 2015/0291470 A1 | 10/2015 | Borrelli et al. |

FOREIGN PATENT DOCUMENTS

| | | |
|---|---|---|
| CN | 101436664 A | 5/2009 |
| CN | 102569756 A | 7/2012 |
| CN | 102769128 A | 11/2012 |
| CN | 103151503 A | 6/2013 |
| JP | 2010170943 A | 5/2010 |
| WO | 2013130696 | 9/2013 |

OTHER PUBLICATIONS

Canham; "Visible Photoluminescence From Porous Silicon";—Chapter 9—INSPEC/IEE—1997; 32 Pages.
Canham; "Pore Type, Shape, Size, Volume and Surface Area in Porous Silicon"; Chapter 2; INSPEC/IEE—1997; 15 Pages.
International Search Report of the International Searching Authority; PCT/US2015/025153; dated Jun. 25, 2015; 4 Pages; European Patent Office.
Martinex-Duart et al; "Photodetectors and Solar Cells Based on Porous Silicon", Phys. Stat. Sol. (B), vol. 232, No. 1, pp. 81-88, 2002.
Wynnyckyj et al; "The Mechanism of Reduction of Silica by Magnesium Vapor", High Temp. Science, vol. 8 pp. 203-217, 1976.
Zhu et al; "Synthesis and Characterization of Mesoporous Silicon Directly From Pure Silica Sodalite Single Crystal"; J. Matter Sci., 45: 6769-6774, 2010.
Zhu et al; "Synthesis of Mesoporous Silicon Directly From Silicate-1 Single Crystals and Its Response to Thermal Diffusion of ZnO Clusters"; J Matter Sci. 46:3840-3845, 2011.
Park et al; "Biodegradalbe luminescent porous silicon nanoparticles for in vivo applications", Nature Materials, vol. 8, pp. 331-336, Apr. 2009.
Bao et al, "Chemical reduction of the three-dimensional silica microassemblies into microporous silicon replicas", Nature, vol. 446, pp. 172-175, Mar. 2007.

(Continued)

*Primary Examiner* — Karie O'Neill Apicella

(57) ABSTRACT

Silicon-silica hybrid materials made by metallothermal reduction from silica and methods of producing such compositions are provided. The compositions have novel properties and provide significant improvements in Coulombic efficiency, dilithiation capacity, and cycle life when used as anode materials in lithium battery cells.

12 Claims, 10 Drawing Sheets

(56) References Cited

OTHER PUBLICATIONS

Fauchet " Porous Polycrystalline silicon thin film solar cells", NREL/SR-520-34824 Oct. 2003.
Chen et al; "Effect of vinylene carbonate (VC) as electrolyte additive on electrochemical performance of Si film anode for lithium ion batteries"; J. Power Source, 2007, 174:538-543.
Aurbach et al; "Vinylene carbonate and Li salicylatoborate as additives in LiPF3 (CF2CF3)3 solutions for rechargeable Li-ion batteries"; J Electrochemical Society, 2004, 151 (1) A23-A30.
Chinese Patent Application No. 2015800277498 Search Report; dated Aug. 28, 2018; Chinese Patent Office.

\* cited by examiner

Fig. 2
Fig. 2A
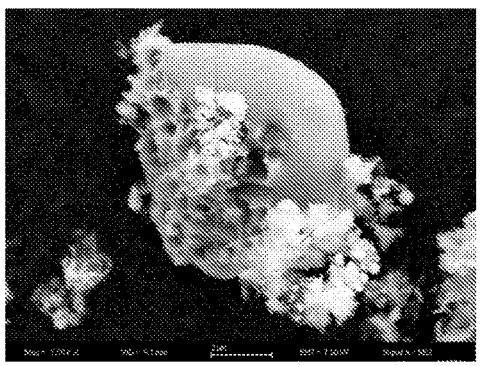
Fig. 2B
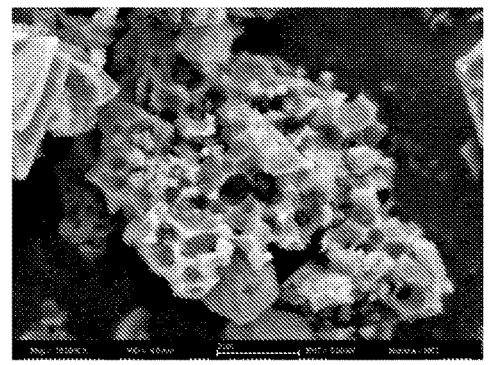
Fig. 2C
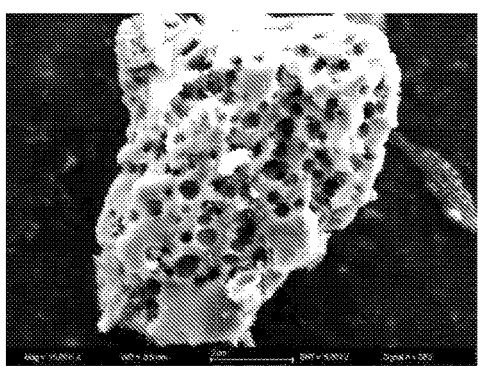
Fig. 2D
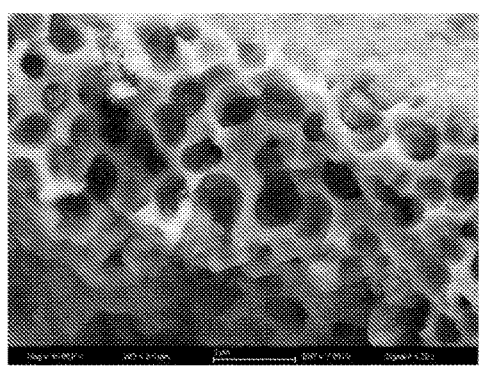

Fig. 5
Fig. 5A
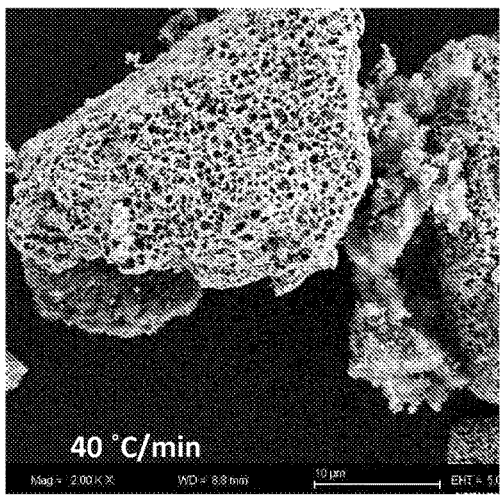
Fig. 5B
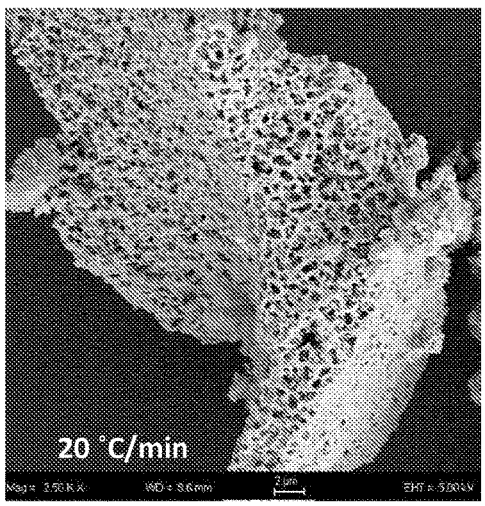
Fig. 5C
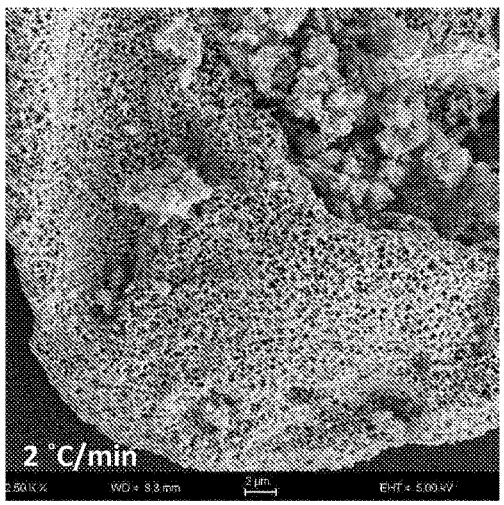
Fig. 5D
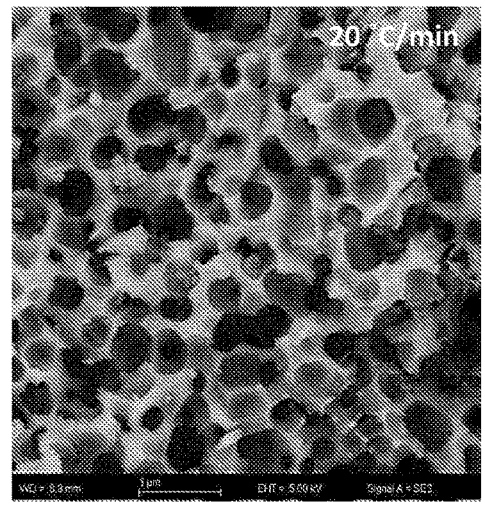

Fig. 6
Fig. 6A
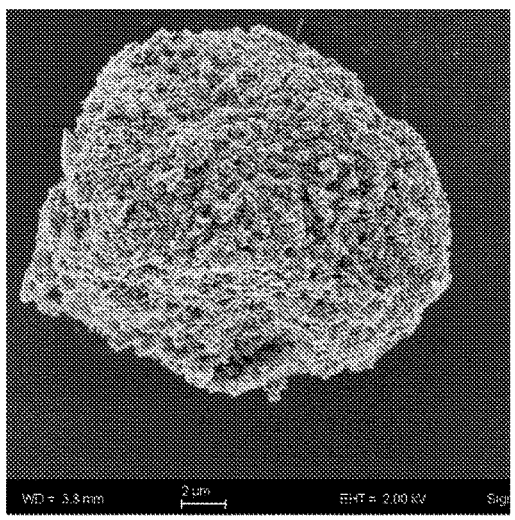
Fig. 6B
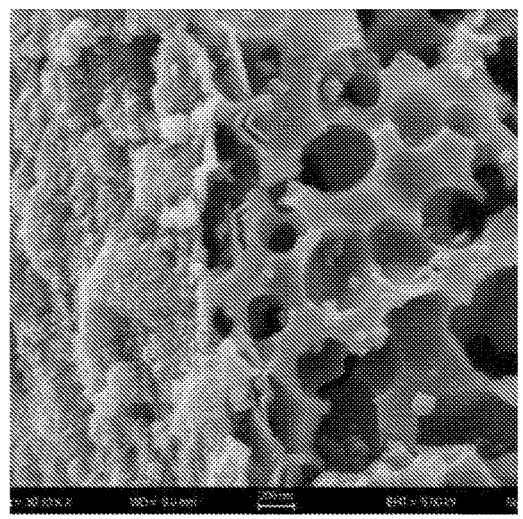
Fig. 6C
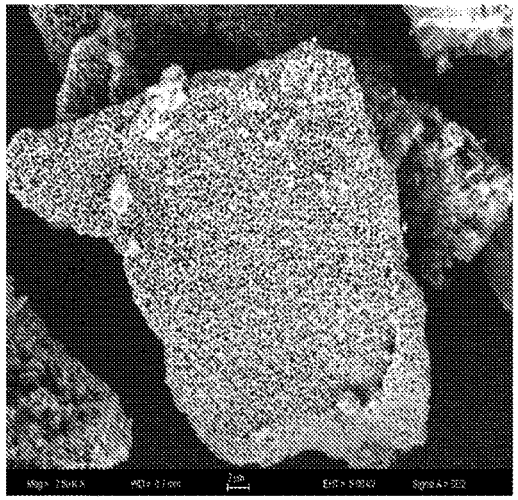
Fig. 6D
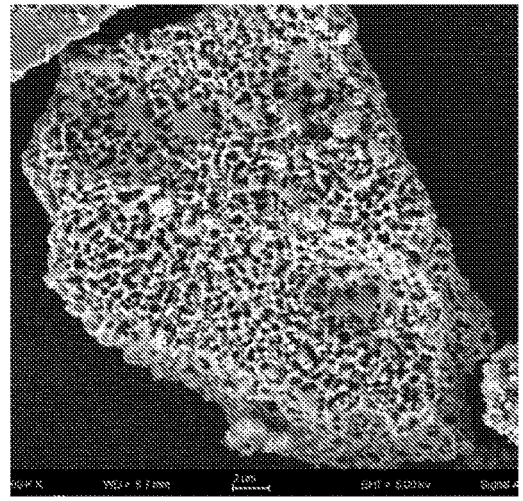

Fig. 8
Fig. 8A
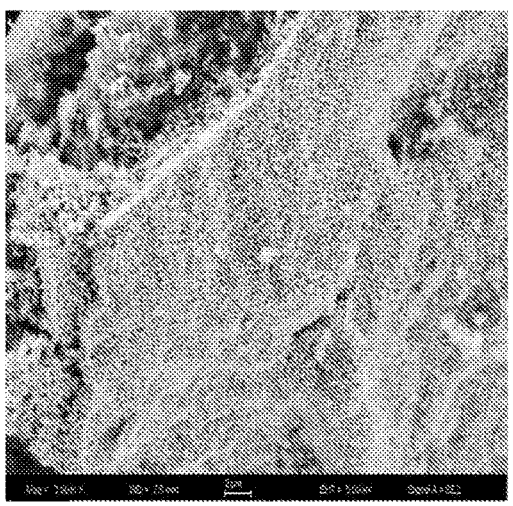
Fig. 8B
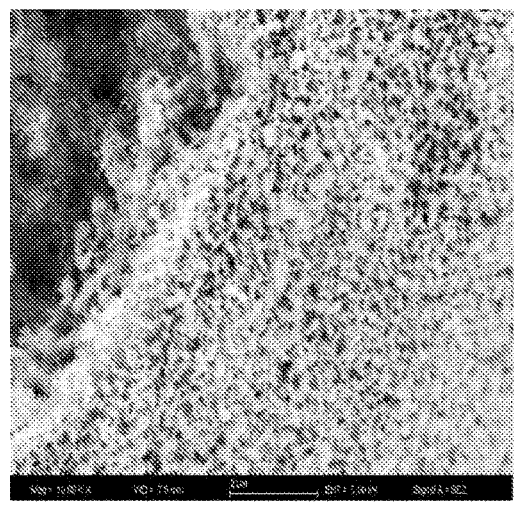
Fig. 8C
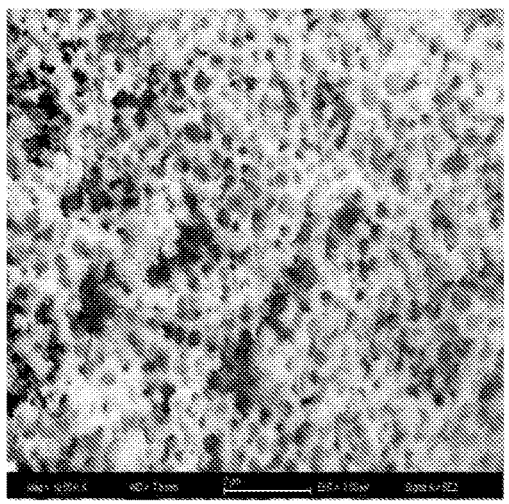

METHOD AND MATERIAL FOR LITHIUM ION BATTERY ANODES

This application claims the benefit of priority under 35 U.S.C. § 371 of International Application Ser. No. PCT/US15/25153, filed on Apr. 9, 2015, which, in turn, claims the benefit of priority under 35 U.S.C. § 119 of U.S. Provisional Application 62/016,897, filed on Jun. 25, 2014, and U.S. Provisional Application No. 61/977,451, filed on Apr. 9, 2014 the content all of which is relied upon and incorporated herein by reference in its entirety.

FIELD

Embodiments generally relate to materials, compositions, and microstructures formed by metallothermal reduction and methods of producing such. More particularly, embodiments relate to silicon-based materials, compositions, and microstructures formed by metallothermal processes, devices incorporating these, and methods of producing such.

BACKGROUND

Lithium ion batteries represent an important class of rechargeable energy storage in which lithium ions move from the negative electrode to the positive electrode during discharge. First proposed in 1972, lithium ion batteries have become widely used in the portable consumer electronics and have been extended into electric vehicles as well. Lithium ion batteries are popular for several reasons including their light weight when compared to most other rechargeable batteries and the fact that they have high open-circuit voltage, low self-discharge rate, reduced toxicity and lack battery memory effect.

In a lithium battery under load, the lithium ions stored on the anode migrate from the anode through an electrolyte medium to the cathode creating an electrical current. During the charging process the lithium metal migrates back onto the anode. Currently, graphite is often used as the anode material. While not necessarily the optimal anode material, graphite's high availability and low cost currently make it an attractive solution. When carbon is used as the anode, the reaction on a Li-ion cell is given as: $6C+2\ LiCoO_2 \leftrightarrow LiC_6+2\ Li_{0.5}CoO_2$. The reactions at each electrode are given as:

At the cathode: 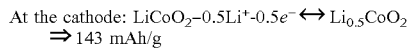
$\Rightarrow 143$ mAh/g

At the anode: 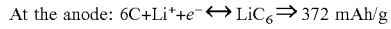

One alternative to graphite as an anode material is silicon. The Li—Si anode system has one of the highest possible gravimetric capacities of all the elements. Further, unlike carbon based anode systems, silicon does not suffer from solvent co-intercalation breakdown. Silicon shows these advantageous properties due to the chemical structure of the Li—Si system—a single silicon atom is able to bind to 4.4 lithium ions, whereas it takes 6 carbon atoms to retain a single lithium ion. When silicon as an anode material is compared to graphitic carbon, the theoretical capacities differ by an order of magnitude. For a range of x from 0 to 4.4, the theoretical specific capacity of pure silicon is 4200 mAh/g, far greater than the theoretical capacity of 372 mAh/g for graphitic carbon. The full reaction is written as:

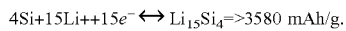

While the above-noted properties seem to make silicon an ideal anode material, one consequence of silicon's enhanced lithium ion interaction is a large increase in volume dilation (>400%). This volume dilation results in the silicon anode structure being subjected to high stress levels and mechanical breakdown. This breakdown means that traditional silicon anodes are unable to go through the multiple charge/discharge cycles necessary for commercialization. Hence, a critical unmet need for the use of silicon as a viable anode material is find a way to structurally stabilize it against multiple volume expansions.

SUMMARY

Embodiments described herein are directed to forming novel products ideally suited as anodic materials utilizing metallothermic processes with powder and soot compositions comprising both single and multiple elements, and methods of forming such products.

A first aspect comprises a hybrid material comprising a. from about 5 wt % to about 50 wt % $M_xSiO_{2+x}$, wherein M is a metal, x is 0 or a positive integer; b. from greater than 20 wt % to about 94 wt % crystalline silicon; and wherein the ratio of crystalline silicon:$M_xSiO_{2+x}$ is from about 1:1 to about 100:1; the hybrid material is in the form of particles having a surface area of from about 10 m²/g to about 250 m²/g; and an average pore size of from about 50 Å to about 250 Å. In some embodiments, the particles have open porosity % from about 75 to about 98%. In some embodiments, the hybrid material has a tap density of greater than 0.07 g/mL. In some embodiments, the particles are less than 45 μm in diameter along the longest axis. In some embodiments, the particles from about 1 μm to about 10 μm in diameter along their longest axis. In some embodiments, the particles are present in a bimodal distribution comprising a first distribution and a second distribution, wherein the first distribution comprises particles from about 1 μm to about 10 μm in diameter along their longest axis and the second distribution comprises particles having a diameter of from about 10 nm to about 500 nm along their longest axis, and wherein the second distribution comprises less than 20% of the total particles.

Regarding the first aspect, the hybrid material may further comprise from greater than 0 wt % to about 65 wt % MgO or from greater than 0 wt % to about 10 wt % MgO. In some embodiments, the hybrid material may further comprise from greater than 0 wt % to about 20 wt % at least one of carbon, manganese, molybdenum, niobium, tungsten, tantalum, iron, copper, titanium, vanadium, chromium, nickel, cobalt, zirconium, tin, silver, indium copper, lithium or zinc.

A second aspect comprises an anode comprising the materials described above. In some embodiments, the anode has a specific capacity of about 50% of the initial value or greater after 100 cycles at 0.1 C discharge rate. In some embodiments, the anode has a gravimetric capacity of 400 mAh/g or greater after 100 cycles at 0.1 C discharge rate. In other embodiments, the anode has a first cycle coulombic efficiency of 50% of the initial value or greater. In still other embodiments, the anode further comprises from greater than 0 wt % to about 70 wt % carbon.

A third aspect comprises a method of making the hybrid materials described above, wherein the method comprises: a. subjecting a silica-containing precursor to a metallothermic process; and b. removing reaction by-products to give the hybrid material. The method may further comprise one or more of the following steps: a. mixing the silica-containing precursor with an elemental metal capable of undergoing metallothermic reaction; b. subjecting the resulting hybrid material to a particle size optimization process; c. cleaning the hybrid material; or d. drying the hybrid material.

In some embodiments, the method comprises: a. mixing the silica-containing precursor with an elemental metal capable of undergoing metallothermic reaction; b. subjecting a silica-containing precursor to a metallothermic process; c. removing reaction by-products via a first leaching process to give the hybrid material; d. optionally subjecting the resulting hybrid material to a particle size optimization process; e. optionally subjecting the hybrid material to a second leaching process to remove reaction by-products; f. drying the hybrid material.

In some methods described above, the method comprises subjecting a silica-containing precursor to a metallothermic process comprises heating the silica precursor to a temperature of greater than 400° C. for more than 2 hours while in the presence of an elemental metal capable of undergoing metallothermic reaction. In some cases, the subjecting a silica-containing precursor to a metallothermic process comprises heating to a temperature of greater than 400° C. for more than 2 hours and subsequently, heating to a temperature of greater than 600° C. for more than 2 hours. In still other embodiments, the silica precursor comprises a silica-containing soot, silica-containing powder, or silica-containing fiber and such silica-containing soot or powders can have an average size along the longest axis of from about 10 nm to about 1 μm.

In some embodiments, the method comprises: a. combining a silica precursor and elemental metal capable of undergoing metallothermic reaction in a ratio of from about 1:1 to less than 2:1 to form a mixture; and b. heating the mixture to a temperature greater than about 650° C. and less than 1000° C.; wherein the heating is done at a ramp rate from about 0.5° C./min to about 50° C./min to form a hybrid material as described above. Some embodiments further comprise removing reaction by-products by acid etching the silica-silicon hybrid with an organic acid having a concentration of from about 1.0 M or greater. Still other embodiments comprise combing the silica-precursor and elemental metal capable of undergoing metallothermic reaction in a homogeneous mixture.

BRIEF DESCRIPTION OF THE DRAWINGS

FIG. 1A is a hybrid material particle post magnesiothermic reduction. FIG. 1B is the same particle at higher magnification. FIG. 1C shows the crystalline nature of the silicon-rich outer periphery of the particle. FIGS. 1D-1F highlight the amount and location of Si (FIG. 1D), O (FIG. 1E), and Mg (FIG. 1F). FIG. 1G shows the presence of Fe in the hybrid material and FIG. 1H is a composite showing the overlap of Si and O.

FIGS. 2A-2D show different embodied hybrid materials formed via the processes described herein.

FIGS. 5A, 5B, 5C, and 5D pictorially show the differences in pore size as a function of temperature ramp rate in the formation of the porous silicon structures. FIG. 5A shows porous silicon created using a process ramp rate of 40° C./min, FIG. 5B shows the structure at a ramp rate of 20° C./min, and FIG. 5C shows the structure at a ramp rate of 2° C./min. FIG. 5D provides a higher resolution micrograph of the structure at ramp rate of 20° C./min which shows in detail the porous structure of the silicon.

FIGS. 6A, 6B, 6C, and 6D provide micrographs of porous silicon hybrid materials before and after cleaning. FIGS. 6A and 6B show that the porous silicon structure before cleaning has a thin forsterite coating on the exterior which may impede the ability of lithium ions to intercalate into the silicon structure. FIGS. 6C and 6D show that after cleaning, the coating on the porous silicon has been removed, exposing the pores.

FIGS. 8A (3,000×), 8B (10,000×), and 8C (10,000×) are micrographs an alternative embodiment wherein the porous silicon is made from $TiO_2$-containing soot. As can be seen in the micrograph, the resulting pores are smaller than in the pure porous silicon and the overall structure appears to have a different texture, which may be the presence of Ti-containing products, such as $TiSi_2$.

DETAILED DESCRIPTION

Figure 1:
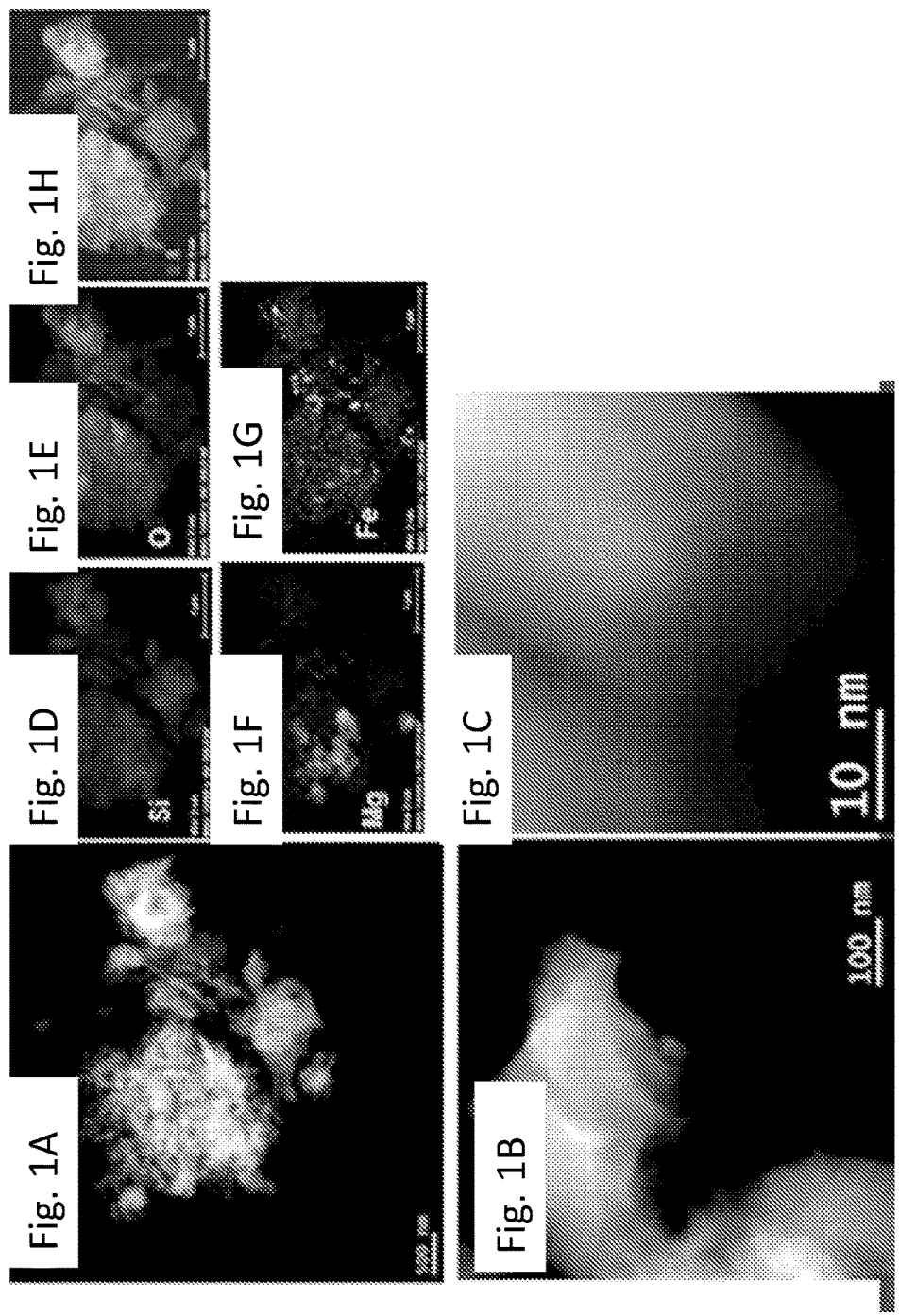
FIGS. 1A-H pictorially describe a transmission electron microscope/energy dispersive spectroscopy (TEM/EDS) analysis of an embodied hybrid material made from powdered Vycor®.

The following description is provided as an enabling teaching and can be understood more readily by reference to the following detailed description, drawings, examples, and claims, and their previous and following description. To this end, those skilled in the relevant art will recognize and appreciate that many changes can be made to the various aspects described herein, while still obtaining the beneficial results. It will also be apparent that some of the desired benefits of the present disclosure can be obtained by selecting some of the features without utilizing other features. Accordingly, those who work in the art will recognize that many modifications and adaptations are possible and can even be desirable in certain circumstances and are a part of the present disclosure. Thus, the following description is provided as illustrative of embodiments and not in limitation thereof. Further, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

Disclosed are materials, compounds, compositions, and components that can be used for, can be used in conjunction with, can be used in preparation for, or are embodiments of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

"Crystal" or "crystalline," as used herein, refers to a solid material whose constituent atoms, molecules, or ions are arranged in an orderly, repeating pattern extending in all three spatial dimensions. As used herein, crystal or crystalline also include polycrystalline materials, quasicrystals, and crystalline materials that comprise defects, impurities, ordered, disordered, and/or twinning.

"Amorphous," as used herein, refers to a solid material that lacks the ordered characteristics of a crystal or crystalline material. In some embodiments, the amorphous materials may comprise a glassy or glass-type material.

"Porosity," as used herein, is a measure of the void space in the crystalline structure. Porosity may be measured using standard measuring techniques, such as the Barrett, Joyner and Halenda method (BJH) or the Brunauer, Emmer and Teller method (BET), both of which are standard methods to determine the surface area, pore size and pore size distribution in materials.

"Doping," as used herein, refers to the insertion into either a crystalline or amorphous composition of an element or compound (referred to as a "dopant") not normally found therein. Dopants often alter the electrical or optical properties of the composition. Examples include, but are not limited to, magnesium, manganese, molybdenum, niobium, tungsten, tantalum, iron, copper, titanium, vanadium, chromium, nickel, cobalt, zirconium, tin, silver, indium, copper, boron, arsenic, phosphorous, antimony, aluminum, gallium, cadmium, germanium, tellurium, or selenium.

"Chemically modifying," as used herein, refers to the modification of the crystal composition or structure via a chemical reaction. Such reactions include, but are not limited to, acid-base, combustion, synthesis, photochemical, decomposition, ion exchange, or displacement reactions.

"Physically modifying," as used herein, refers to the modification of the crystal composition or structure via a physical process, such as, but not limited to, crushing, grinding, cutting, pressure, heating, cooling, or ablation.

"Metallothermic," as used herein, refers to a displacement reaction wherein at least one solid oxide compound is at least partially converted to the base element or an alternative compound comprising the base element via chemical reaction. In some embodiments, the reaction is done in the gas phase with the gas comprising magnesium or calcium, e.g., as a gas/solid reaction. However, in some cases, the metallothermic reduction process is done under conditions where one or more of the reactants are in liquid phase e.g., the magnesium or calcium and/or the silica composition. In some embodiments, the reaction is done via an electronically-mediated reaction.

"Powders," as used herein, refers to finely dispersed solid particles with an average diameter along at least one dimension of from about 10 nm to about 500 μm. Generally, powders tend to comprise somewhat spherical particles, but the particles may have other structures, such as needles, cubes, etc. as a function of crystallinity, crystal structure, methods of forming, etc.

"Soot," as used herein, refers to silica-containing particles made by flame combustion of silica precursors. Soots are a subset of powders that 1) comprise silica and 2) are formed via specific process and have unique or distinct properties, such as good particle size and shape homogeneity, high surface areas, and controllable compositional formulations. Soots may generally comprise a Gaussian distribution of particle sizes.

Hybrid Material

The current disclosure expands the scope of materials available for the manufacturing of components for electrochemical processes. As stated above, there is continued need for improvements in electrical storage. The four critical aspects of any battery system can be broken down into cycle life, capacity, Coulombic efficiency (C.E.), and cost (the four C's). The desired figures of merit for the four C's are a battery that has ≥80% efficiency after 100 cycles, a capacity greater than 500 mAh/g after 100 cycles, a C.E. of ≥85% after the first cycle and is comparable in cost to current devices. While each of these metrics is important in advancing battery technology, on a commercial level, cost is often the most critical element for market entry. An additional consideration not included above is the scalability of the process. A dynamic solution that is impractical on a commercial scale or cannot meet customer needs without dramatically raising costs will fail even if it solves many of the other problems. For example, then incumbent anode material, graphite, is highly abundant, readily processable, and costs ~$20-40/Kg. Any improvements that hope to displace graphite will likely have to be similar in cost.

Silicon has unique properties that could potentially make an anode containing it significantly better than current graphite anodes. However, as noted above, silicon undergoes material degradation when it is used as an anode and subjected to repeated cycling. Therefore, there is a continued need to find alternative structures that have the high dilithiation properties of silicon, but also have the long term stability necessary for a rechargeable battery.

Disclosed herein are structures that comprise porous silicon and yield structures that are inexpensive, able to be made on commercial scales, stable over the desired cycle life, and show cycle efficiencies that are up to 600% higher than graphite.

Current embodiments disclose cheap, efficient and powerful ways to manufacture highly porous structures. While being of specific interest for use in lithium battery anodes, the hybrid materials made by the processes described herein can also be used in a wide range of applications such as; molecular sensing, catalysis, molecular sieves, opto-electronics, computing, energy storage, batteries, field electron transmitting (FET) and n-MOSFET or p-MOSFET, drug delivery, anti-microbial uses, cell culture, cell based assays, ion channel assays, organic hybrid polymer composites, inorganic hybrid polymer composites, health care, medicinally, cement, transparent electrical conductors, superconductors, super magnets, piezoelectric, pyroelectric, microwave-synthesis, anti-microbial, anti-cancer, petroleum production and refinement, quantum entanglement, metamaterials, energy, electronics, microelectronics, nanoelectronics, spintronics, chiral synthesis, gas sensing, gas separation, water purification, electrolysis, electrochemical reactions & synthesis, magnetic susceptibility, environmental gas clean up, carbon sequestration, catalytic converters, fiber optical devices, lenses, ion exchange, RFID, LEDs, OLEDs, refractory materials, conductors, computers, quantum computers, integrated circuits, quantum cascade lasers, extruded ceramic devices, missile covers, molecular separation, lighting, explosives, aerospace applications, heat sinks, thermoelectric sensors, thermocouples, pH meters, high temperature refractors, chemical lasers, as targets for mass spectrometry, UV-Vis optics, fluorescent dye cavities, nuclear reactions, transformers, solenoids, non-linear optics, electric motors, photovoltaics, metal removal, electrochemical reactions/synthesis, surfactants, adsorption, adhesives, phonon sensing, lighting, lasers biosensors, optical waveguides, photovoltaics, photo catalysis, electroluminescence, surface enhanced Raman spectroscopy, and the like.

A first aspect comprises a silicon-silica hybrid material. The hybrid material comprises regions of silicon oxide, $M_xSiO_{2+x}$, wherein M is a metal, x is 0 or a positive integer, and regions of silicon, and may be formed by metallothermic reduction processes.

The hybrid materials of disclosed herein can be made from silica precursors. Materials that can be used as silica precursors to form the hybrid material generally include any silica-based composition. The silica precursors may comprise pure silica or alternatively, may comprise silica compositions that further comprise dopants or impurities. Particularly useful silica precursors are silica powders and silica soots. Generally, it is advantageous when silica precursor particles or powders are on the order of nanoscale or microscale.

Silica soot particles can have an average size from about 10 nm to about 1 μm when measured along the longest axis and may have any desired shape, such as, for example spheroid or fractal. The silica soots may further comprise dopants or impurities. Examples of dopants or impurities that may be included in the silica precursor include, but are not limited to, Al, Ca, Cr, Cu, Fe, K, Mg, Mn, Na, Ni, P, Sn, Ti, Zn, Zr, Li, and C. Dopants that may be advantageous in certain embodiments comprise magnesium, manganese, molybdenum, niobium, tungsten, tantalum, iron, copper, titanium, vanadium, chromium, nickel, cobalt, zirconium, tin, silver, indium or copper, and combinations thereof. In such embodiment, these materials may be present from greater than 0 wt % to about 10 wt %, however typically they are present in amounts less than 3 total combined wt %.

Generally, silica soot is made by flame combustion of silica precursors. The precursors can be made by digesting silica particles to synthesize silicon tetrafluoride, silicon tetrachloride, or organosilicon precursors. The particles are then flame hydrolyzed to produce silica soot. The flame combustion process controls the nucleation and growth (coalescence of the molten particles) and size. In soot production, the soot particles are quenched to prevent consolidation and collected in a "bag house."

Figure 9:
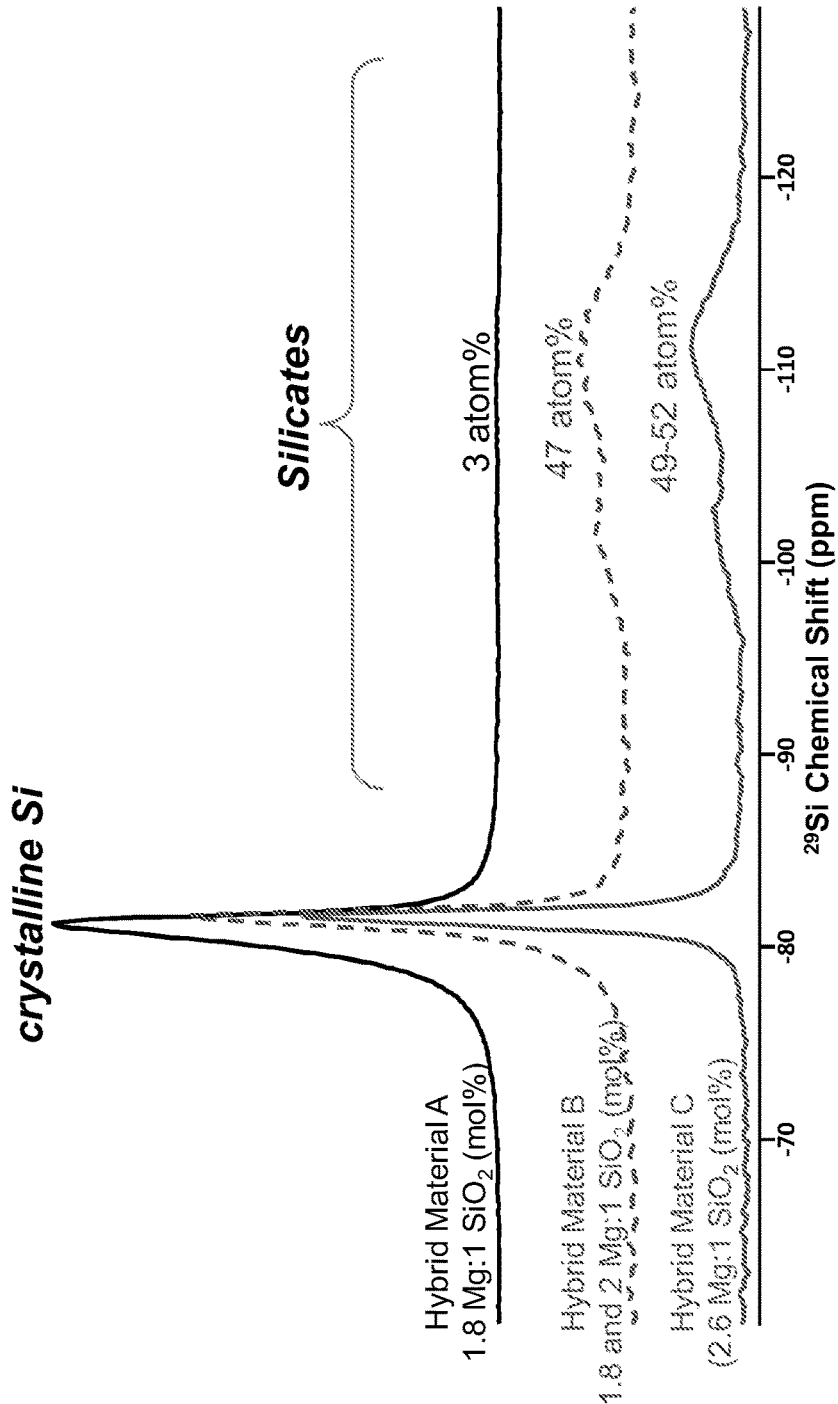
FIG. 9 contains $^{29}Si$ magic-angle spinning nuclear magnetic resonance (MAS-NMR) spectra of representative hybrid materials resulting from magnesiothermic reduction of silica soots.
Figure 10:
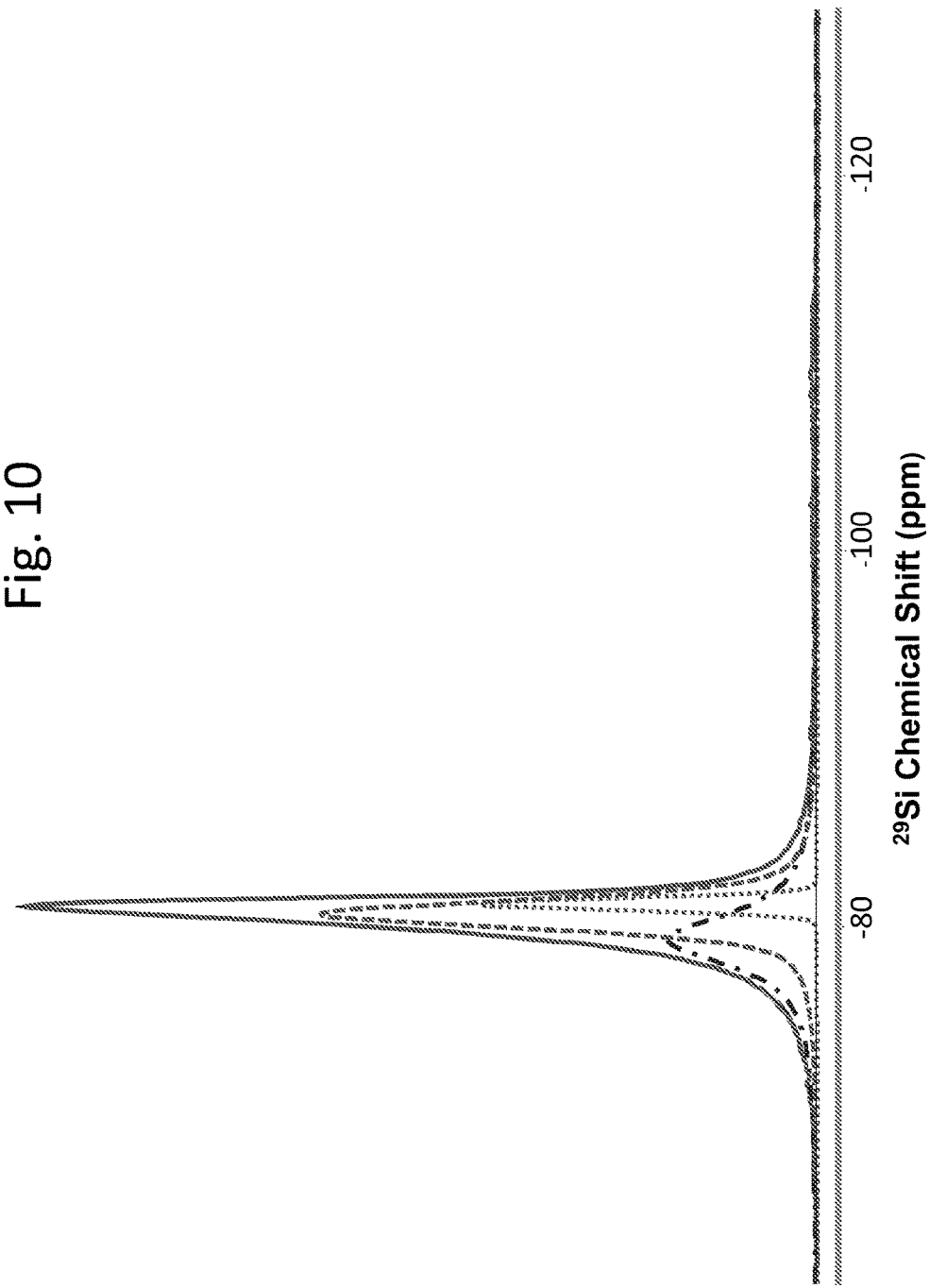
FIG. 10 shows the $^{29}Si$ MAS NMR spectrum for a hybrid material made using the 1.8:1 molar ratio of Mg to $SiO_2$, with one possible deconvolution (dashed curves) of the crystalline silicon resonance into ordered and disordered components.

Hybrid materials formed from silica soots are shown in FIG. 1 and FIG. 2. As shown in the FIGS. 1A-1D, the silicon oxide and silicon are present throughout the resulting hybrid material. The silicon can be distinguished, in part, from the silica by its ordered structure as seen in FIG. 1C as well as from the distinct NMR shift difference (FIG. 9 and FIG. 10). FIGS. 2A-D pictorially describe a scanning electron microscope (SEM) analysis of an embodied hybrid material produced via magnesiothermic reduction of a soot composition with different Mg to silica ratio. FIG. 2A shows the porous silicon produced from Mg to silica soot at 1.5:1 molar ratio. FIGS. 2 B-D shows the reduced silicon produced from Mg:silica ratio at 1.8:1, 2.0:1 and 2.6:1. All the porous silicon were synthesized at partial pressure higher than 1 atmosphere. The temperature of syntheses was 800° C. held for 2 hours. These figures show the evolution of different microstructures by utilizing different process parameters like composition, temperature, pressure.

Referring again to FIG. 9, the figure shows $^{29}$Si magic-angle spinning nuclear magnetic resonance (MAS-NMR) spectra of representative hybrid materials resulting from magnesiothermic reduction of silica soots. These data clearly show a narrow peak from crystalline silicon (around −80 ppm), as well as residual silicates (both $SiO_2$ and magnesium silicates), which give rise to the relatively broad peaks between −90 and −115 ppm. The peak areas for these different chemical environments are fully quantitative and provide values for the silicon to silicate ratio of these hybrid materials. Within the shift range for silicon, these data also show a variation in the extent of ordering in the crystalline silicon, with peak broadening and asymmetry reflecting residual disorder and/or particle surface sites. These features can be deconvoluted to yield approximate ratios for the ordered and disordered silicon in these materials. Further, FIG. 10 shows the $^{29}$Si MAS NMR spectrum for a hybrid material made using the 1.8:1 molar ratio of Mg to $SiO_2$, with one possible deconvolution (dashed curves) of the crystalline silicon resonance into ordered and disordered components.

One advantageous aspect of the hybrid materials is their high porosity levels. While not wanting to be held to any particular theory, it is posited that the high porosity levels of the hybrid material in combination with the structural interactions of the silicon oxide and silicon regions provides for enhanced structural integrity in the hybrid materials. However, in some embodiments, it has been found that how the porosity is obtained is critical to the overall efficiency of the hybrid material in anode applications. In some embodiments, it is desirable to maximize pore size and restrict surface area to obtain the best materials—in essence, to obtain big, open pores. In some embodiments, larger pore sizes improve electrode performance by, for example, affecting the first coulombic efficiency of the anode. The hybrid material can have a Barrett-Joyner-Halenda (BJH) pore size from about 50 Å to about 250 Å. In some embodiments, the BJH pore size is from about 50 Å to about 200 Å, about 50 Å to about 150 Å, about 50 Å to about 100 Å, about 100 Å to about 250 Å, about 100 Å to about 200 Å, about 100 Å to about 150 Å, about 150 Å to about 250 Å, about 150 Å to about 200 Å, or about 200 Å to about 250 Å.

Another advantageous aspect of the hybrid materials is their surface areas. As noted above, in some embodiments, the surface area works in combination or synergistically with the pore size to provide improved hybrid materials. Surprisingly, it has been found that rather than trying to maximize the surface area of the hybrid material, a moderate surface areas improve the performance of anode incorporating these hybrid materials. It is posited that the higher surface area may result in trapping of lithium ions, forming more solid electrolyte interface (SEI) layer. In some embodiments, in order to mitigate SEI formation, the surface area of the hybrid materials range from about 10 m$^2$/g to about 250 m$^2$/g. Embodiments include hybrid materials with surface areas from about 10 m$^2$/g to about 250 m$^2$/g, 10 m$^2$/g to about 200 m$^2$/g, 10 m$^2$/g to about 150 m$^2$/g, 10 m$^2$/g to about 100 m$^2$/g, 10 m$^2$/g to about 75 m$^2$/g, 10 m$^2$/g to about 50 m$^2$/g, 10 m$^2$/g to about 25 m$^2$/g, 25 m$^2$/g to about 250 m$^2$/g, 25 m$^2$/g to about 200 m$^2$/g, 25 m$^2$/g to about 150 m$^2$/g, 25 m$^2$/g to about 100 m$^2$/g, 25 m$^2$/g to about 75 m$^2$/g, 25 m$^2$/g to about 50 m$^2$/g, 50 m$^2$/g to about 250 m$^2$/g, 50 m$^2$/g to about 200 m$^2$/g, 50 m$^2$/g to about 150 m$^2$/g, 50 m$^2$/g to about 100 m$^2$/g, or 50 m$^2$/g to about 75 m$^2$/g.

In addition to pore size and surface area, in some embodiments the % open porosity of the hybrid material can play an important role in material performance. In some embodiments, the formed hybrid material has % open porosity of from about 10% to about 98%. In other embodiments, the formed hybrid material has % open porosity of from about 75% to about 98% or about 90% to about 98%.

Tap density of the hybrid material refers to the bulk density of the material after a compaction process as measured using the ASTM B527-14 standard. It has been found that in some embodiments, the tap density of the hybrid material plays a critical role in achieving the best packing of the particles during coating as well as handling. In some embodiments, the tap density is more than 0.07 g/mL, and particularly higher than 0.24 g/mL or higher than 0.4 g/mL. In some embodiments, the tap density is from about 0.07 g/mL to about 1.0 g/mL, about 0.24 g/mL to about 1.0 g/mL, or about 0.4 g/mL to about 1.0 g/mL.

In some aspects, the processability of the hybrid material is important to make a uniform coating on the copper current collector to be used as an anode. If the particle size is too big, the anode coating tends to form streaks and inhomogeneity while processing. Therefore, in some embodiments, in order to have a uniform coating on the anode it is desirable that the hybrid material have a particle size below 45 μm along their longest axis. In some embodiments, the hybrid materials formed from nanoscale soots and powders are generally from about 1 μm to about 10 μm in diameter along their longest axis. In some instances, the particles are roughly spherical with a diameter from about 1 μm to about 10 μm. In some embodiments, posited for packing purposes, it is advantageous for the particles sizes to be a bimodal distribution of smaller and larger particles. In such embodiments, wherein the particles are present in a bimodal distribution, the distributions comprise a first distribution and a second distribution, wherein the first distribution comprises particles from about 1 μm to about 10 μm in diameter along their longest axis and the second distribution comprises particles having a diameter of from about 10 nm to about 500 nm along their longest axis. In such embodiments, the ratio of first:second distribution is from about 30:1 to about 1:1, and particularly from 20:1 to 5:1, or alternatively less than 20% particles in the second distribution.

The hybrid material comprises a combination of silicon and $M_xSiO_{2+x}$, wherein M is a metal, x is 0 or a positive integer. In some embodiments, the silicon is crystalline. The amount of crystalline silicon in the hybrid material is from about 20 wt % to about 94 wt %. In some embodiments, the amount of crystalline silicon is from about 20 wt % to about 94 wt %, about 20 wt % to about 90 wt %, about 20 wt % to about 80 wt %, about 20 wt % to about 70 wt %, about 20 wt % to about 60 wt %, about 20 wt % to about 50 wt %, about 50 wt % to about 94 wt %, about 50 wt % to about 90 wt %, about 50 wt % to about 80 wt %, about 50 wt % to about 70 wt %, about 50 wt % to about 60 wt %, about 60 wt % to about 94 wt %, about 60 wt % to about 90 wt %, about 60 wt % to about 80 wt %, about 60 wt % to about 70 wt %, about 70 wt % to about 94 wt %, about 70 wt % to about 90 wt %, about 70 wt % to about 80 wt %, about 80 wt % to about 94 wt %, about 80 wt % to about 90 wt %, or about 90 wt % to about 94 wt %.

As noted above, for $M_xSiO_{2+x}$, wherein M is a metal, x is 0 or a positive integer. In some embodiments, M comprises the elemental metal used in the metallothermic reaction, and may comprise, e.g., Mg, Ca, Al, Ti, etc. In some embodiments, the amount of $M_xSiO_{2+x}$ is from about 5 wt % to about 50 wt %. In some embodiments, the amount of $M_xSiO_{2+x}$ is from about 5 wt % to about 50 wt %, about 5 wt % to about 40 wt %, about 5 wt % to about 30 wt %, about 5 wt % to about 20 wt %, about 5 wt % to about 10 wt %, about 10 wt % to about 50 wt %, about 10 wt % to about 40 wt %, about 10 wt % to about 30 wt %, about 10 wt % to about 20 wt %, about 20 wt % to about 50 wt %, about 20 wt % to about 40 wt %, about 20 wt % to about 30 wt %, about 30 wt % to about 50 wt %, about 30 wt % to about 40 wt %, or about 40 wt % to about 50 wt %.

In certain embodiments, the ratio of silicon to $M_xSiO_{2+x}$ is critical to the stability of the material when undergoing multiple volume expansions, such as when used as an anode material in a lithium battery. In these embodiments, the ratio of silicon:$M_xSiO_{2+x}$ is from about 1:1 to about 100:1. In some embodiments, it is advantageous if the ratio of silicon:$M_xSiO_{2+x}$ is from about 10:1 to about 100:1. In some embodiments, the ratio of silicon:$M_xSiO_{2+x}$ is from about 1:1 to about 100:1, about 1:1 to about 90:1, about 1:1 to about 80:1, about 1:1 to about 50:1, about 1:1 to about 25:1, about 1:1 to about 10:1, about 1:1 to about 8:1, about 1:1 to about 5:1, about 1:1 to about 3:1, about 10:1 to about 100:1, about 10:1 to about 90:1, about 10:1 to about 80:1, about 10:1 to about 50:1, or about 10:1 to about 25:1.

The hybrid materials may further comprise additional compounds that have no effect, a limited effect, or may have a positive or synergistic effect on the material's properties. These include dopants, impurities, and products of side reactions from the formation of the hybrid material. For example, some embodiments comprise from greater than 0 wt % to about 65 wt % MgO, CaO, or $Al_2O_3$, or from greater than 0 wt % to about 10 wt % MgO, CaO, or $Al_2O_3$, primarily stemming from the reaction process. While these materials can be removed from the hybrid material by, for example, washing the product with an organic acid, residual amounts may remain and do not affect the performance of the hybrid material. Dopants and/or impurities that may be present and advantageous in certain embodiments of the hybrid material comprise magnesium, manganese, molybdenum, niobium, tungsten, tantalum, iron, copper, titanium, vanadium, chromium, nickel, cobalt, zirconium, tin, silver, indium, or copper, and combinations thereof. In such embodiment, these materials may be present from greater than 0 wt % to about 10 wt %, however typically they are present in amounts less than 3 total combined wt % and may be either amorphous or crystalline.

The hybrid materials may be incorporated into anodes for electrochemical devices, especially lithium battery devices. Of particular interest is the use of the hybrid materials in lithium battery anodes. When the hybrid materials are used in lithium battery anodes, it is possible to obtain advantageous properties not seen with other materials. For example, anodes comprising hybrid materials have a specific capacity of about 20% or greater than graphite after 100 cycles at a 0.1 discharge rate. In some embodiments, the specific capacity of anodes comprising hybrid materials is about 30% or greater, 40% or greater, 50% or greater 60% or greater, 70% or greater, or 80% or greater than graphite after 100 cycles at a 0.2 discharge rate.

In some embodiments, anodes comprising hybrid materials show improvements in gravimetric capacity. The gravimetric capacity of anodes comprising hybrid materials can be about 400 mAh/g or greater, about 500 mAh/g or greater, or about 600 mAh/g or greater after 100 cycles at 0.1 C discharge rate. Additionally, such anodes may also show coulombic efficiencies after the first cycle of greater than 50%, 60%, 70%, 80%, 90, or 95%.

The hybrid materials described herein may be combined with other anode materials known in the art. For example, the hybrid materials may be combined with carbon and may have a synergistic effect when used as an anode material. In some embodiments, the hybrid material is combined with carbon in an anode where the anode comprises greater than 0 to about 95 wt % carbon.

Other components used in lithium battery applications are well known to skilled artisans and may be added to the anode design as necessary and applicable. For example, lithium compounds that can be used with the hybrid materials comprise lithium metals, oxides, alloys, binary alloys, etc.

Process

The hybrid materials described herein can be formed via a number of metallothermic-type processes that utilize a metallic element, such as magnesium, to remove oxygen from the precursor material. These processes include, for example, 1) vapor phase synthesis and 2) molten phase synthesis or Self-Propagating High Temperature Synthesis (SPHS). During the vapor phase synthesis, the precursors can be separated in the reaction chamber, allowing the metal vapor to reduce the silica particles resulting in the final Si product generally retaining the initial silica structure.

In contrast, the SPHS process is a molten phase process where the precursors can be mixed together homogenously and reacted in a closed system. In some embodiments, the closed system is allowed to react under high partial pressures—e.g., over 1 atmosphere, such as 1.5, 2, 3 or more atmospheres. In the case of a molten phases synthesis, irrespective of the initial precursor, the final structure created is porous. The pores, at least in some embodiments, are formed from precipitation of the products like periclase (MgO), magnesium-silicide ($Mg_2Si$) and Forsterite ($Mg_2SiO_4$) in the molten Si matrix. After cleaning and leaching of the hybrid material, these reaction products dissolve, leaving behind a porous structure.

Figure 7:
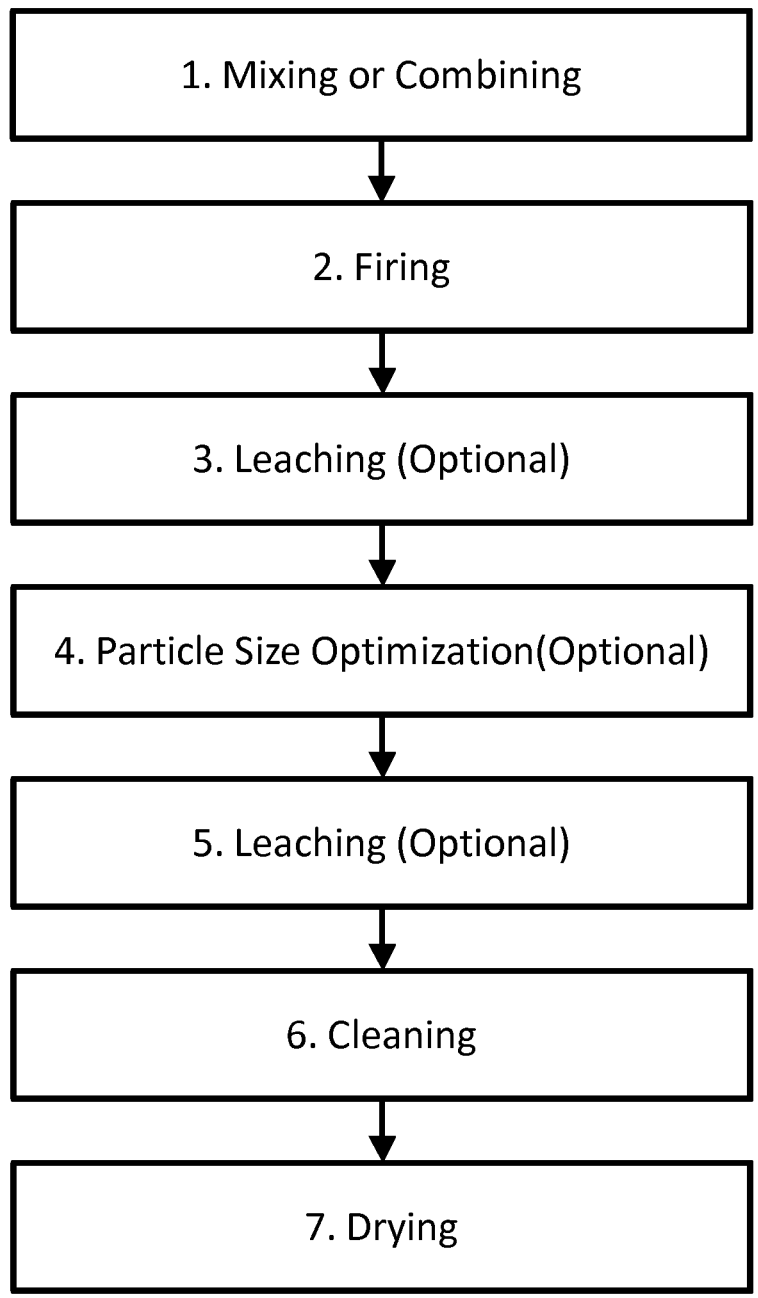
FIG. 7 is a process diagram showing a method of producing the embodied hybrid materials described herein. The process describes seven steps: mixing, firing, leaching (optional), particle size reduction (optional), leaching (optional), cleaning, and drying the resulting product.

The overall process for forming the hybrid materials by either process embodied herein is shown in FIG. 7. The first step, Mixing or Combining, as described above, comprises combining the precursor silica-containing materials in a reaction vessel with the reactive elemental metal, wherein the vessel allows for either molten phase synthesis or vapor phase synthesis. Regarding the reactive elemental metal, it is possible to use Ellingham diagrams to determine which elements have sufficient energy to reduce the oxides present in the precursor. Magnesium can reduce most of the common oxides (except for CaO, which can be etched later by other means) at reasonably lower temperatures than, for example, carbon gas. Therefore, it is normally the case that a powder or soot made of a multi-component oxide can be extracted via metallothermic reduction using magnesium gas. However, it is contemplated that a variety of suitable reduction materials can be utilized without departing from the scope of the present disclosure. For example, and not by way of limitation, it is contemplated that the metallic reducing element may comprise magnesium, calcium, sodium, rubidium, or combinations thereof. In a simplified, somewhat ideal case, where the metallic material comprises magnesium, the corresponding stoichiometric reaction with the silica glass substrate is as follows:

$$2Mg + SiO_2 \rightarrow Si + 2MgO.$$

Analogous reactions would characteristic for similar reducing material. Such reactions may be done on any unreactive or limitedly reactive surface, including metals, other crystals, glass, ceramic, glass-ceramic, fiber, optical fiber, fusion drawn glass, chemically strengthened glass or glass that is re-drawn and laminated with polymers.

While stoichiometry dictates that the ratio of magnesium to silica should be 2:1 molar ratio, it has been found that in the process for making the hybrid materials described herein, other stoichiometric ratios may be advantageous. The table below shows how the molar ratio of $Mg:SiO_2$ advantageously changes the surface area, porosity, pore diameter, along with silicon crystal size and openness of pores (Table 1):

TABLE 1

| Mg:SiO$_2$ molar ratio | BET surface area (m$^2$/g) | Surface Area of Pores (m$^2$/g) | BJH Avg. Pore Dia. (Å) | Si crystallite size (nm) | Hybrid density helium gas pycnometry (g/cc) | % Open porosity |
|---|---|---|---|---|---|---|
| 1.5 | 58.8 | 34.6 | 100.5 | 267 | 1.80 | 77 |
| 1.8 | 70.9 | 36.0 | 90.4 | 372 | 2.27 | 97 |
| 2.0 | 39.2 | 21.8 | 112.0 | 374 | 2.21 | 94 |
| 2.2 | 90.0 | 39.0 | 89.1 | 301 | 2.20 | 94 |
| 2.6 | 175.1 | 97.8 | 78.0 | 202 | 2.13 | 91 |

To enhance reduction and/or as an alternative reaction process, the precursors may be subjected to spark plasma, microwave, or RF exposure. The metallic element can be derived from any conventional or yet to be developed source including, for example, a metal source subject to microwave, plasma or laser sublimation, an electrical current, inductive heating, or a plasma arc to induce metal gas formation. In cases where the metallic element is derived from a metal source, it is contemplated that the composition of the metal source can be varied while reacting the metallic element with the silica precursor substrate to further enhance reduction.

Additional defects can be formed in the metal or metalloid substrate by irradiating the surface of the substrate with electrons. The resulting defects enable a more facile and extensive extraction of oxygen by the metallothermic reducing gas agent and, as such, can be used to enhance oxygen extraction by subjecting the glass substrate to electron beam irradiation prior to the above-described metallothermic reduction processes. Contemplated dosages include, but are not limited to, dosages from approximately 10 kGy to approximately 75 kGy, with acceleration voltages of approximately 125 KV. Higher dosages and acceleration voltages are contemplated and deemed likely to be advantageous.

Still considering FIG. 7, step 1, the reaction must be done under an inert atmosphere. Examples of an inert atmosphere include nitrogen and argon. Also, in some embodiments, the atmosphere can be designed to favor reduction by having a partial pressure of hydrogen (e.g., 98% argon, 2% H$_2$). Additionally, as noted above, in both molten and vapor cases, it may be advantageous to provide a reaction vessel that is closed and capable of maintaining a pressure of greater than ambient.

Referring again to FIG. 7, the second step, Firing, comprises heating the reaction vessel, precursor materials, or inert atmosphere or a combination thereof to a temperature sufficient to allow reaction to occur. To facilitate the oxygen extraction, the reaction temperature, T, will be between about 400° C. and about 900° C. For example, and not by way of limitation, for soot, a suitable reaction temperature T will be approximately 660° C. and can be maintained for approximately two hours. In some embodiments, the reaction temperature is about 400° C., 425° C., 450° C., 475° C., 500° C., 525° C., 550° C., 575° C., 600° C., 625° C., 650° C., 675° C., 700° C., 725° C., 750° C., 775° C., 800° C., 825° C., 850° C., 875° C., or 900° C. In some embodiments, the reaction temperature is greater than 400° C., 425° C., 450° C., 475° C., 500° C., 525° C., 550° C., 575° C., 600° C., 625° C., 650° C., 675° C., 700° C., 725° C., 750° C., 775° C., 800° C., 825° C., 850° C., 875° C., or 900° C. Reduced reaction temperatures are contemplated for low pressure reaction chambers.

In addition to the reaction temperature, the ramp rate used to heat the precursor materials also plays a role in the resulting reaction. In fact, it has unexpectedly been found that ramp rates for heating the precursor components to the reaction temperature can have a dramatic effect on the resulting structure. It is generally the case that the resulting pore structure in the hybrid materials is larger with faster ramp rates. As described in FIGS. 5A-5C, when moving from a ramp rate of 40° C./min to 2° C./min, the pores in the resulting hybrid material decrease in size dramatically. This result provides for the ability to "tune" the pore structure to the particular device or system via a simple modification of the process parameters. Ramp rates can be set from 1° C./min to more than 50° C./min, for example 1, 2, 5, 10, 20, 30, 40, 50, 75, or 100° C./min.

In some reactions, byproducts like Mg$_2$Si are generated and the reducing step described above can be followed by byproduct removal steps. Referring to FIG. 7, steps 3 and 5, Leaching comprises the application of chemicals to remove unwanted byproducts and may optionally be done after firing, after additional steps related to granulation or particle size reduction, or both. Generally, the application of an strong organic acid in water, alcohol, or polar organic solvent will remove the reaction byproducts. However, in some cases, it may be necessary to sonicate or apply a mixing force to remove byproducts adhered to the hybrid materials. In some cases, it is advantageous to centrifuge the resulting materials to separate out byproducts or to size-separate the actual products. Alternatively, to avoid byproduct generation and the need for the byproduct removal step, it is contemplated that the stoichiometry of the reduction can be tailored such that the metallic gas is provided in an amount that is not sufficient to generate the byproduct. However, in many cases, the composition of the crystalline precursor will be such that the generation of additional reaction byproducts is inevitable, in which case these additional byproducts can be removed by the etching and thermal byproduct removal steps described herein.

Referencing FIG. 7, step 4, the resulting hybrid material can be subjected to particle size optimization to increase performance or meet end user criteria. Processes for optimizing particle size are well known in the art and include, for example, grinding, crushing, pulverizing, milling, granulation, agglomeration, and mixing. Subsequent to this step, as noted above, the hybrid material can optionally be subjected to a leaching step to remove any unwanted byproducts or other components. Finally, the hybrid material is cleaned or washed, for example via one or more washings in deionized water and/or via sonication and centrifugation and/or with other or additional solvents (e.g., ethanol) to remove any impurities or additional unreacted precursors or byproducts, such as MgO (FIG. 7, step 6) and then subjected to a drying step (e.g., via a drying oven) to remove any residual water or solvents (FIG. 7, step 7). The end product may be a silicon-silica hybrid with additional, optional dopants present.

Although the various embodiments of the present disclosure are not limited to a particular removal process, it is noted that the metal-oxygen complex can be removed from the surface of the metal or metalloid substrate by executing a post-reaction acid etching step. For example, and not by way of limitation, post-reaction acid etching may be executed in a 1M HCl solution in water and alcohol (molar HCl (conc.): $H_2O$:EtOH (~100%) ratio=0.66:4.72:8.88) for at least 2 hours. Alternate alcohols may also be used in the etching step. Depending on the porosity of the glass, some additional MgO may be trapped inside the glass and additional etching may be needed for longer periods of time with multiple flushes of the acidic mixture.

EXAMPLES

Example 1

Laboratory Scale Reactions

The following procedure can yield ~20-30 grams of hybrid material. Silica soot (pure white powder) is combined with pure magnesium metal powder (black powder) in a ratio of about 1:1.8 by mole. Changes in ratio give different pore sizes resulting in different final properties. The magnesium source is magnesium granular powder, 20-230 mesh, reagent grade, 98% (254126-500G Sigma-Aldrich). Alternatively, magnesium turnings (99.8% pure from Alfa Aesar) can be used. The finer grade magnesium powder (Sigma-Aldrich 254126-500G, reagent grade, 98%) yields the most even distribution of sublimation and reduction reaction which is believed to be a consequence of having both the silica particles distributed more evenly with the smaller magnesium particles. Magnesium turnings however do not appear to sublimate evenly and hence, the travel of the sublimed gas into the soot powder is not as even.

The powder mixture is transferred to a graphite or chemically inert (no-oxide) crucible that is subsequently covered and sealed. The crucible is placed into an oven under a pure argon atmosphere. The atmospheric conditions can be blended with other inert gases like a percentage of nitrogen or be designed to contain a forming gas like 1-3% hydrogen in 99-97% argon. Alternatively, the atmosphere can also be vacuum.

Heat treatment of glass sample is in an oven under at temperature between 660° C.-950° C. (e.g., 800° C. used herein) to generate the following reaction below:

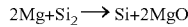

$$2Mg+Si_2 \rightarrow Si+2MgO$$

For example, the oven is set to 800° C. with a standard ramp rate (e.g., 2° C./min) from room temperature. The reaction is allowed to dwell at the 800° C. temperature for about 2-4 hours.

The final powder is a reddish brown color with some faint blackish-blue particulate. This powder is then extracted chemically. The particle size is reduced to ~5 μm. While the following section describes a wet etch method for removal of magnesium oxide, Forsterite, and magnesium silicide structures, we note that a dry etch method is equally plausible. For example, U.S. Pat. No. 4,132,586, herein incorporated by reference in its entirety, describes both wet and dry etchants for selective removal of magnesium oxide and in particular, a solution containing ammonium oxalate can be used in place of 1M hydrochloric acid.

The third step involves transferring the reduced hybrid material powder to a beaker containing an "extraction buffer." The extraction buffer dissolves the MgO and other byproducts to yield the hybrid material in a powder. FIG. 6A is a micrograph of hybrid product particle having pre-cleaning. The particle has a coating of Forsterite that is layered on the surface and potentially impacting the effectiveness of the resulting product. FIG. 6B is a higher magnification micrograph showing the coating blocking the interior of the particle. The extraction buffer can made of a strong organic acid, such as 1M hydrochloric acid, in water, alcohol, a polar organic solvent, or a combination thereof. In particular, the solvent system may be a combination of an alcohol (e.g., methanol, ethanol, propanol) and water, e.g., 66% methanol and 33% water. The hybrid material is allowed to sonicate for 90 mins to remove the Forsterite and other byproducts and then centrifuged. FIGS. 6C and 6D show the particles post-sonication in a 1M HCl ethanol solution. The etching process can also be adjusted to control what materials are extracted. Prior to metallothermic reduction, a majority of the oxygen-containing lattice is not silicon and we find that our etching process removes most of these materials effectively in addition to the MgO. However, changing the base solvent solution could decrease or increase the acid-etched extractibles. Such adjustments might yield changes in conductivity and porosity. Finally, the extracting liquid is removed and the powders can be washed with, for example, a number of changes of solvent (e.g., 5). After multiple extractions the powder is dried to completion in a vacuum oven set to 85° C. for several hours.

Alternatively, a dry etching process can be used to purify the hybrid product. Dry etching refers to the selective removal of material by exposing the material to a bombardment of ions (usually a plasma of reactive gases, such as fluorocarbons ($CF_4$), oxygen, chlorine ($CCl_4$/Ar, $Cl_2$/Ar), or boron trichloride, sometimes with addition of nitrogen, argon, helium and other gases) that dislodge portions of the material from the exposed surface. The plasma may be inductively coupled. The dry chemical etching process typically etches directionally or anisotropically. The dry etching hardware designs basically involve a vacuum chamber, special gas delivery system, RF waveform generator and an exhaust system. The table below (from U.S. Pat. No. 4,132,586, herein incorporated by reference in its entirety) shows the dry etch removal rates for magnesium oxide, silica and alumina. As can be seen from this table both silica and alumina etch in all cases much faster over MgO. However, the material generated from the metallothermal reduction process would likely yield an outer layer proximity of the magnesium oxide (as a byproduct of the porous silicon formation) relative to the porous silicon. It is likely that a brief exposure of the MgO-porous silicon to just Argon alone at an RF setting of 13.56 MHz and 1.6 W/cm² power would be enough to dislodge the exterior layer of MgO.

| REMOVAL RATES (Å/minute) | | | |
|---|---|---|---|
| | Mask Material | | |
| Dry Etching Conditions | MgO | $SiO_2$ | $Al_2O_3$ |
| 1.6 W/cm², 50 μAr, 13.56 MHz | 15 | 65 | 25 |
| 1.6 W/cm², 50 μCF₄, 13.56 MHz | 50 | 1000 | 200 |
| 0.3 W/cm², 2 μCCl₄/8 μAr, 27 MHz* | 20 | 200 | 100 |

*Reactive ion etching process of U.S. Pat. No. 3,994,793

Example 2

Microstructures of Porous Silicon-Containing Materials

FIGS. 1A-1H are TEM/EDS analysis images of the porous silicon made from conversion of silica soots into silicon. These hybrid powders are used in making electrodes in lithium ion batteries and other lithium ion energy storage systems. These images are representative of the microstructure that is seen in the hybrid materials that are used in lithium ion battery studies (FIGS. 1A-1C). In FIG. 1C, the close up image of the silicon portion of the particles reveals that it is comprised of silicon sheets. The analysis does show some slight residual presence of magnesium on the porous silicon particles (FIG. 1F), as well as Fe (FIG. 1G) but we note that this contaminant is not of levels high enough to impair lithium battery functionality. The composite overlay of oxygen with silicon is shown in FIG. 1H. The images demonstrate a plurality of open and available silicon pockets. Some outer periphery oxygenation of the silicon did occur during processing, but again, as with the contaminating MgO, it is not enough to block lithium ion battery function.

Example 3

Lithium Ion Battery Testing Using Porous Silicon-Containing Materials

Button cell lithium ion batteries are prepared using the hybrid material in the anode. Slurries of the porous silicon samples are made using a suspension ink and binders and then the slurry is tape cast over a copper foil. No optimization of the slurry forming technique has been done. The foil with the hybrid material film is dried and disk shaped anodes are made via a punch. The anodes are then located with spacers into a coin-style battery assembly which is sealed. The electrolyte (DC-19) is a mixture of fluoroethylene carbonate (FEC):ethylmethyl carbonate (EMC) 3:7 by volume, with 1.0 M $LiPF_6$ or alternatively, comprises ~35% dimethyl carbonate, ~35% diethyl carbonate, ~16% lithium hexafluorophosphate and <40% other organic compounds. Additional organic agents, like vinylene carbonate (VC), can be added in small amounts 0.5% up to ~6% to enhance silicon anode performance by stabilizing the silicon structure.

Figure 3:
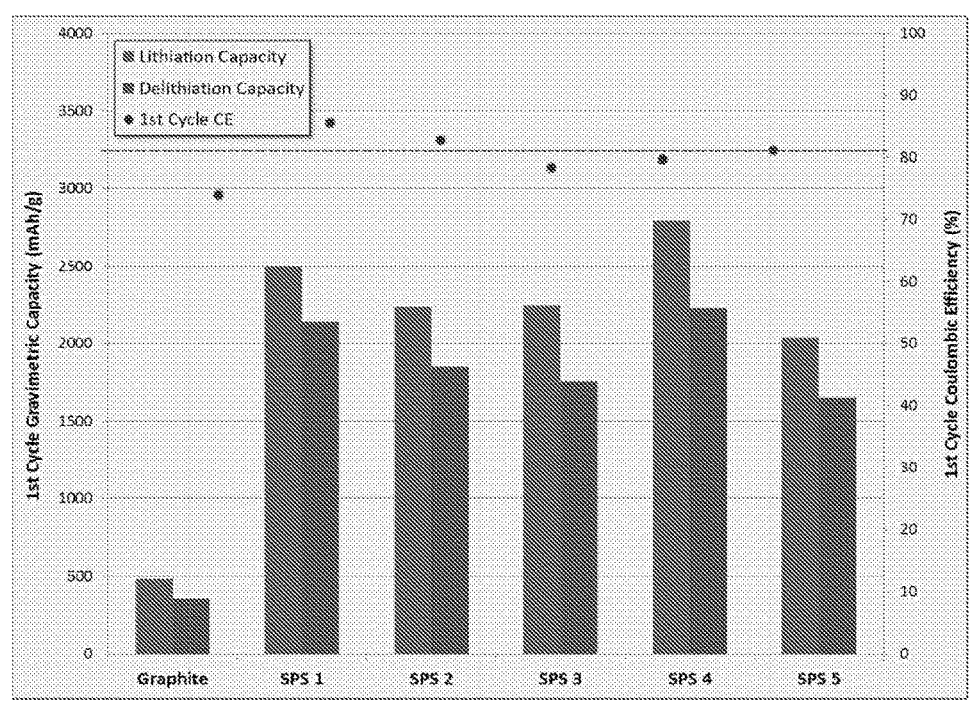
FIG. 3 shows the 1st cycle gravimetric capacity for a number of samples of hybrid materials embodied herein compared to the current performance of graphite. The data show up to a 600% improvement for the hybrid materials over the graphite materials with 80-90% first cycle coulombic efficiency. The cell testing was performed using the following protocol—Charging: CC at C/20, 0.01-2V; Discharging: CC of C/20V.

FIG. 3 shows the first cycle gravimetric capacity and Coulombic efficiency of the lithium ion batteries using various hybrid materials embodied herein. Graphite is shown as a comparator on the left hand side of the graph. The left bars for each sample are a measure of the lithiation capacity and the right bars represent delithiation capacity for the various materials. When a ratio is taken of the lithiation to delithiation values, a figure of merit is obtained for the first cycle of use. This value is shown in FIG. 3 as a point. This figure of merit describes the stability of the anode material as a function of initial interaction with lithium ions. The top dashed line is provided to show the 85% efficiency level—a desired industry standard for automotive applications that are more stringent that consumer electronics market. As can be seen in the figure, the lithiation to delithiation ratio for all the hybrid materials are near or exceed the desired values of 85%.

Figure 4:
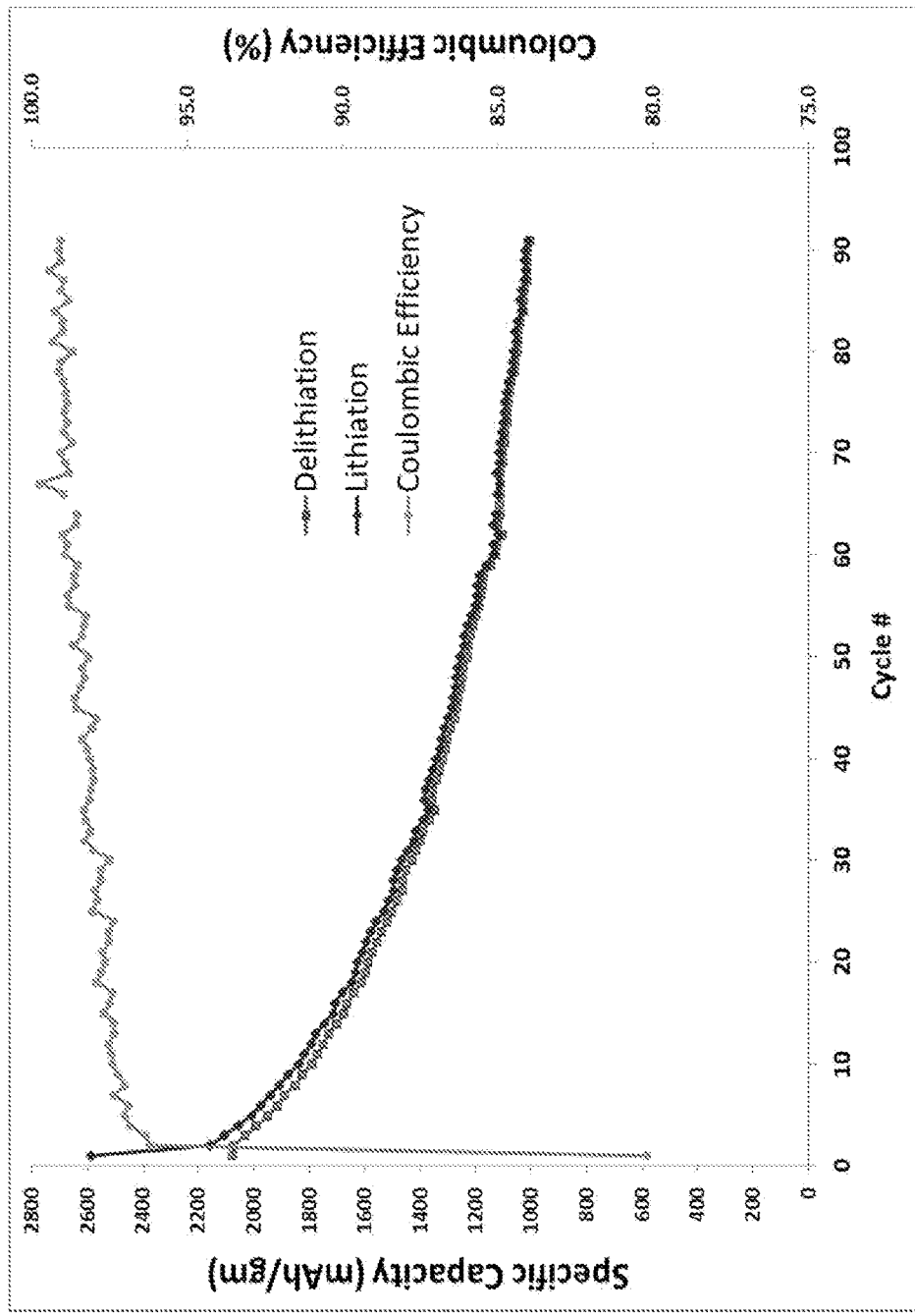
FIG. 4 provides the lithiation and delithiation capacity (mAh/g) of embodied porous silicon anode batteries over a 100 cycle test at 0.2 C discharge rate along with the Coulombic efficiency as a function of cycle. The figure shows that the coulombic efficiency improves to over 98% within the first five cycles.

FIG. 4 shows the capacity retention for 100 cycles. In particular, while the graph shows that there is a moderate loss in capacity during the first cycle, the capacity tends to level out within the first 100 cycles. The capacity loss does not exclude the hybrid materials from being used in anode applications. In fact, the capacity retention even including this loss is significantly better in the embodied hybrid materials than the currently used graphite. It is possible that the loss is associated with gross formation of solid-electrolyte interphase (SEI) during the first cycles. Additionally, that the fact that the loss flattens out over multiple cycles is desirable in battery applications where long term stability is necessary. Finally, the coulombic efficiency for the hybrid materials approaches 99% very quickly.

Example 4

Porous Silicon-Containing Microstructures and Alloy Compositions

Example 4A

The biggest challenge in utilizing silicon as an anode material in lithium battery applications is its stability against volumetric swelling. As lithium ions locate onto the porous silicon, they inherently cause a swelling of the silicon structure. After multiple cycles of swelling or expansion and retraction during charge and discharge the structure becomes damaged. However, the embodied hybrid materials retain their structural performance over 100 cycles or more. Multiple characterizations of the hybrid materials shows that the silicon that forms during the process is etched inwardly by the oxygen extraction of the magnesium. It is likely that this etching process is not complete and that parts, and particularly the core, of the particles have significant areas of $SiO_x$ due to incomplete reaction. Yet, when exposed to etchants that effect only silica, like hydrofluoric acid, the particles completely dissolve into suspensions of silicon flakes far smaller than the initial starting particle. This inner core of silica is fortuitous for making a functional anode battery because it acts as a stabilizing scaffold allowing for multiple volume expansions of the silicon when interacting with the lithium ions.

Example 4B

In alternative embodiments, it is possible that doping of the precursor material could further alter the inner core silica. For example, since the soot-forming process can accommodate multicomponent gases, the soots could be tailored to use additional doping agents. Alternatively, precursor particles could be stabilized by or include additional agents (see, e.g., U.S. Pat. No. 8,071,238, herein incorporated by reference in its entirety) to make them less susceptible to expansion and contraction of the silicon. For example, FIGS. 8A-C are micrographs of a hybrid material formed from a silica composition comprising 6.3 wt % $TiO_2$ at 3000× (FIG. 8A), 10,000× (FIG. 8B), and 10,000× (FIG. 8C). The resulting product appeared to have little to no Forsterite present, and the pore size was smaller than seen when using pure silica precursors. Further, as can be seen in the micrographs, the structure of the hybrid materials is different. This may be a result of the alloying of silicon with $TiSi_2$ products, or the formation of $TiSi_2$ particles on the hybrid material. It is possible that the combination of materials may provide for a more stable structure than silicon alone as the materials act in a synergistic manner.

Example 5

Fluidized Bed Reactor (Prospective)

One possible way to generate batch-scale quantities of porous silicon is via a fluidized bed reactor. Gas extraction is achieved by flowing gas into a subliming magnesium bed wherein the magnesium gas is carried by directional flow upward into a reaction chamber in which unreacted silica soot or silica powder is used to provide a flow of particles within the reactor. The reacted particles exit via a directional flow of gas. The method envisioned is similar to that used in the polysilicon industry where instead of quartz as the feed material, gaseous silicon trichloride is fed into the reducing chamber. The reducing reactor for conventional silicon is given as:

$SiHClSi + 3HCl \rightarrow SiHCl_3 + H_2$ (see, e.g., U.S. Pat. No. 6,541,377, herein incorporated by reference in its entirety).

Example 6

Porous Silicon Reactor (Prospective)

Bulk silicon is used by the steel industry and termed "metallurgical grade" silicon (99% pure MG-Si). In some cases, bulk silicon production by the steel industry involves taking silica in the form of quartz sand and reducing it as it is fed into a large furnace reactor using carbon as the reducing agent at a temperature of ~2000° C. The reducing reaction is $SiO_2 + 2C \rightarrow Si + 2CO$. However, since silicon melts at 1414° C., our process cannot be done via a heating process greater than about ~1000° C. Generally, embodied processes are run at a temperature of ~700° C. and bulk combined powder of silica and magnesium would be intermixed. The chamber is sealed, flushed, and then filled with a recyclable inert gas mixture of argon and/or nitrogen, or argon, nitrogen and hydrogen (3%). The reaction vessel has pressure controls to manage vapor buildup and heating elements are located throughout the reaction vessel or at the outer walls, and further, the can be combined with inductive heating elements. Alternatively, the magnesium powder can be located at the bottom of the reaction vessel, allowing the magnesium vapor to rise upward into a shallow loosely packed silica bed that has a mechanical agitator that allows magnesium gas extraction to occur during reaction cycle.

We claim:

1. A hybrid material comprising:
   a. from about 5 wt% to about 50 wt % $M_xSiO_{2+x}$, wherein M is a metal, x is 0 or a positive integer;
   b. from greater than 20 wt % to about 94 wt % crystalline silicon;
   wherein:
      the ratio of crystalline silicon: $M_xSiO_{2+x}$ is from about 1:1 to about 100:1;
      the hybrid material is in the form of particles having:
         a surface area of from about 10 m²/g to about 250 m²/g; and
         an average pore size of from about 50 Å to about 250 Å; and
      the particles are present in a bimodal distribution comprising a first distribution and a second distribution.

2. The hybrid material of claim 1, wherein the particles have open porosity from about 75% to about 98% or the hybrid material has a tap density of greater than 0.07 g/mL.

3. The hybrid material of claim 1, wherein the particles are from about 0.01 μm to less than 45 μm in diameter along their longest axis.

4. The hybrid material of claim 1, wherein the first distribution comprises particles from about 1 μm to less than 45 μm in diameter along their longest axis and the second distribution comprises particles having a diameter of from about 10 nm to about 500 nm along their longest axis, and wherein the second distribution comprises less than 20% of the total particles.

5. The hybrid material of claim 1, further comprising from greater than 0 wt % to about 65 wt % MgO.

6. The hybrid material of claim 5, wherein the material comprises from greater than 0 wt % to about 10 wt % MgO.

7. The hybrid material of claim 1, wherein the material further comprises from greater than 0 wt % to about 20 wt % at least one of carbon, manganese, molybdenum, niobium, tungsten, tantalum, iron, copper, titanium, vanadium, chromium, nickel, cobalt, zirconium, tin, silver, indium copper, lithium or zinc.

8. A hybrid material comprising:
   a. $M_xSiO_{2+x}$, wherein M is a metal, x is 0 or a positive integer, from about 5 wt % to about 50 wt %; and
   b. crystalline silicon from greater than 20 wt % to about 94 wt %; wherein:
      the ratio of crystalline silicon: $M_xSiO_{2+x}$ is from about 1:1 to about 100:1;
      the hybrid material is in the form of particles; and
      the particles are present in a bimodal distribution comprising a first distribution and a second distribution, wherein the first distribution comprises particles from about 1 μm to less than 45 μm in diameter along their longest axis and the second distribution comprises particles having a diameter of from about 10 nm to about 500 nm along their longest axis, and wherein the second distribution comprises less than 20% of the total particles.

9. An anode comprising the material of claim 1, wherein the anode has a specific capacity of about 50% of the initial value or greater after 100 cycles at 0.1 C discharge rate.

10. An anode comprising the material of claim 1, wherein the anode has a gravimetric capacity of 400 mAh/g or greater after 100 cycles at 0.1 C discharge rate and the anode has a first cycle coulombic efficiency of 50% of the initial value or greater.

11. The anode of claim 9, wherein the anode further comprises from greater than 0 wt % to about 70 wt % carbon.

12. The hybrid material of claim 8, wherein the hybrid material has a tap density of greater than 0.07 g/mL; wherein the hybrid material further comprises one or more of:
   a. from greater than 0 wt % to about 65 wt % MgO; or
   b. from greater than 0 wt % to about 70 wt % at least one of carbon, manganese, molybdenum, niobium, tungsten, tantalum, iron, copper, titanium, vanadium, chromium, nickel, cobalt, zirconium, tin, silver, indium copper, lithium or zinc; and
wherein the particles have one or more of:
   a. a surface area of from about 10 m²/g to about 250m²/g;
   b. an average pore size of from about 50 Å to about 250 Å; or
   c. an open porosity in a range from about 75% to about 98%.

* * * * *

UNITED STATES PATENT AND TRADEMARK OFFICE
CERTIFICATE OF CORRECTION

PATENT NO. : 10,439,206 B2
APPLICATION NO. : 15/302646
DATED : October 8, 2019
INVENTOR(S) : Francis Martin Behan et al.

Page 1 of 1

It is certified that error appears in the above-identified patent and that said Letters Patent is hereby corrected as shown below:

On the Title Page

In Column 2, item (56), Other Publications, Line 19, delete "Biodegradalbe" and insert -- Biodegradable --, therefor.

In the Claims

In Column 19, Line 56, Claim 1, delete "$M_xSio_{2+x}is$" and insert -- $M_xSio_{2+x}$ is --, therefor.

In Column 20, Line 61 (approx.), Claim 12, delete "$250m^2/g;$" and insert -- $250\ m^2/g;$ --, therefor.

Signed and Sealed this
Twenty-fifth Day of February, 2020

Andrei Iancu
*Director of the United States Patent and Trademark Office*